United States Patent [19]

McCaughey

[11] Patent Number: 4,673,993
[45] Date of Patent: Jun. 16, 1987

[54] METHOD FOR SYNCHRONIZING A TAPE RECORDER TO A COMPUTER UNDER PROGRAM CONTROL

[76] Inventor: Michael P. McCaughey, 1235 East River Oaks, Baton Rouge, La. 70815

[21] Appl. No.: 817,345

[22] Filed: Jan. 9, 1986

[51] Int. Cl.⁴ .................. G11B 27/22; G11B 31/00
[52] U.S. Cl. .................................................. 360/79
[58] Field of Search ................................. 360/79, 80

[56] References Cited

U.S. PATENT DOCUMENTS

| | | | |
|---|---|---|---|
| 3,869,719 | 3/1975 | Jenkins | 360/72 |
| 3,877,363 | 4/1975 | Parilla | 360/12 |
| 3,974,522 | 8/1976 | Fukatsu et al. | 360/14 |
| 4,586,905 | 5/1986 | Groff | 434/307 |

Primary Examiner—George G. Stellar
Attorney, Agent, or Firm—Robert C. Tucker; William David Kiesel

[57] ABSTRACT

A method is provided for operationally synchronizing movement of an audio tape for a tape recorder with a program controlling computer monitor where the audio tape is recorded in a manner that segments of sound are separated by either tones or periods of silence and then played back in conjunction with the computer monitor wherein the tones or lengths of silence are detected and signaled to a mechanism for stopping the tape recorder spindles.

2 Claims, 3 Drawing Figures

METHOD FOR SYNCHRONIZING A TAPE RECORDER TO A COMPUTER UNDER PROGRAM CONTROL

BACKGROUND OF THE INVENTION

1. Field of the Invention

This invention relates in general to computer peripheral devices and more particularly to synchronizing an audio cassette played on a standard (unmodified) tape recorder to a computer controlled monitor.

2. Description of the Prior Art

Interactive computer programs where a display is shown on a monitor are often used for educational and training purposes. Instructional capabilities are accelerated when these programs are interfaced with an audio track. Student or trainee interest as well as the rate of receiving and retaining information is increased when the senses of both sound and sight are used. The interfacing of a computer program and an audio track requires careful synchronization and currently takes at least five different forms which will now be addressed.

One form concerns a video cassette or disc which stores both visual and audio information. No synchronization is necessary because the same medium is used. Disadvantages are that video equipment is sophisticated and expensive.

A second approach utilizes the same audio cassette to store the program for controlling the computer as well as the audio track. Again, no synchronization is necessary as the same tape controls the monitor and the audio track. The drawbacks with this approach are that the computer must be designed to facilitate this form of tape storage. Most computers now use disc rather than tape drive because the disc is faster to load and less prone to error.

A third form concerns a computer program controlling a speech synthesizer which uses digitally encoded speech. These synthesizers are expensive and natural sounding digitally encoded speech requires large memory capacity.

A fourth approach uses an audio cassette in a standard tape recorder operating in cooperation with a computer monitor under separate program control. As the tape plays, the computer generates a display on the monitor. After passage of a set time interval equal to the length of the audio segment, the computer turns the tape recorder off. It is difficult to keep the audio and visual sequenced in this approach since everything relies on precise timing. Small irregularities in the tape drive can cause the audio and visual to go further out of synchronization as time passes.

A fifth method uses an audio cassette in a tape recorder controlled by an internal microcomputer which determines exact position by counting the revolutions of both tape spindles. This microcomputer can communicate with the computer interfaced with the monitor and control the spindle drive motors to play specific tape segments in cooperation with the monitor display. This method's drawback is that a specially designed tape recorder is required.

SUMMARY OF THE INVENTION

Therefore, one object of this invention is to provide a method in which the audio cassette of a standard tape recorder is synchronized with a monitor under computer program control.

Another object of this invention is to provide for this synchronization by use of a peripheral device which will turn off the tape recorder at a time after a predetermined event such as a tone or pause occurs on the audio tape.

It is still another object of this invention to turn the tape recorder back on again through the computer while under program control.

A further object of this invention is to allow the tape recorder to run uninterrupted and to have the delivery of the video segments speed up or slow down to synchronize the monitor to the tape player.

A further object of this invention is to physically add only one peripheral device, easily installed by the user, to a system comprised of a tape recorder and a computer with monitor.

Still a further object of this invention is to apply this synchronized method to a range of educational and recreational activities. Examples of these activities include talking books, music, or other sounds to enhance video games and instruction manuals for sophisticated programs.

Another object of this invention is to add a second tape recorder to the system which will turn on simultaneously when the first recorder is being turned off, and vice versa, will be turned off when the first recorder is turned on. The objective of the second tape recorder is to record a student's or other user's response to interactive programming.

Another object of this invention is to provide educational programs that can be used by the blind. The monitor device would be a braille typewriter or some similar device usable by the blind.

There are of course other objects and advantages of this invention which are apparent from the ensuing description of the invention.

Accordingly, a method is provided for operationally synchronizing movement of an audio tape for a tape recorder with a program controlling a computer monitor where the audio tape is recorded in a manner that segments of sound are separated by either tones or periods of silence and then played back in conjunction with the computer monitor wherein the tones or lengths of silence are detected and signaled to a mechanism for stopping the tape recorder spindles.

PREFERRED EMBODIMENTS OF THE INVENTION

Figures 1, 2:
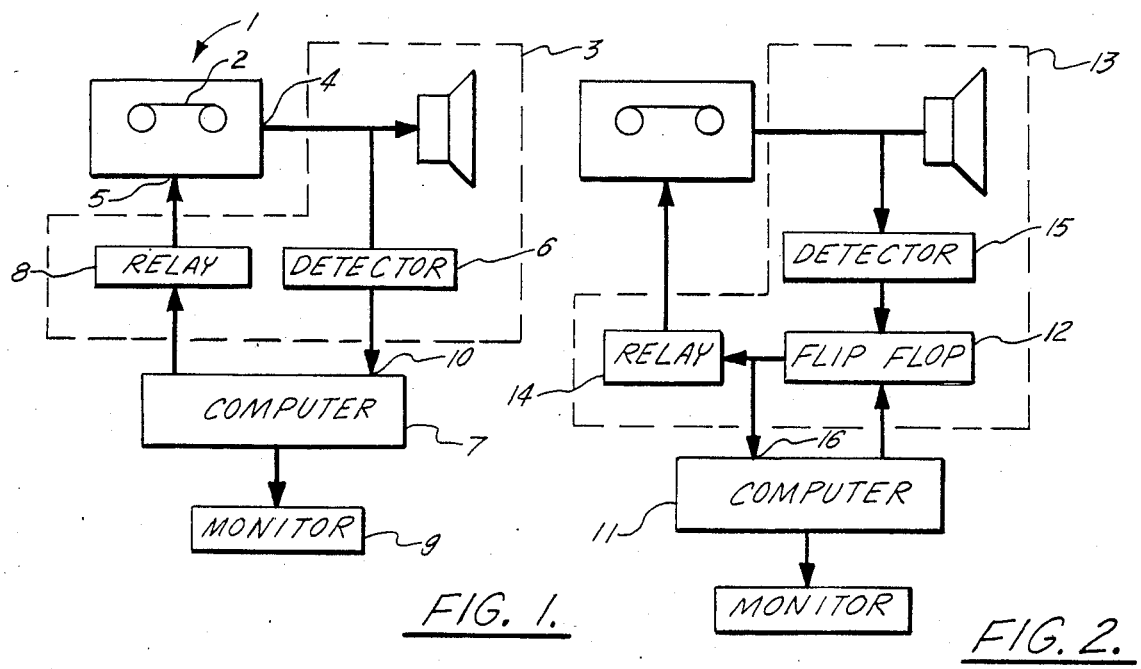
FIG. 1 is a schematic diagram of synchronization method for a computer having an interrupt request port.
FIG. 2 is a schematic diagram of synchronization method not having an interrupt request port.

Referring to FIG. 1 wherein a standard tape recorder/player 1 is provided with an audio tape 2 which has been recorded in a manner to strategically locate "events" on the tape that are synchronized with computer-based, interactive programming. An "event" may be either in the form of a period of silence or a tone. When the tape 2 is played on the tape recorder 1, the event is picked up by a peripheral device 3 connected to the earphone jack 4 and remote control jack 5 of the tape recorder 1. The principal component of this peripheral device is a detector 6 which receives a signal corresponding to an "event" and transfers it through a interrupt request port 10 to a computer 7 which may turn the recorder 1 off by a transistor or relay 8. When using the interrupt request port 10, it is not necessary to turn the recorder off every time an "event" is detected. It may be desirable just to use the timing information provided by the "event" to accelerate or decelerate the delivery of the subsequent passage displayed on the monitor.

When a tone is used as an "event," it is placed on the tape with a tone generator (not shown) and located with a tone detector. A tone generator may use a relay under computer control to produce an accurate and reproducable pulse which may be coded. These tone pulses may be made unobtrusive when a stereo tape recorder is used by placing the tone on one channel and the voice which the user listens to on a second channel. By contrast, when the "event" is a period of silence, the detector used is an audio amplifier with an off delay of several seconds. This configuration is commonly called a voice activated switch (VOX).

Once the tape recorder 1 is turned off, the computer 7 controlled by an interactive program (not shown) may proceed in any desired manner and allow the user to interact with computer's 7 monitor display 9. When a point in this program is reached where it is desirable to continue the audio tape 2, the computer will check to assure the tape recorder 1 motor is off and then will turn the motor on under program control. At this point, the tape and computer monitor display will be synchronized.

An alternate embodiment is shown in FIG. 2 where the computer 11 has no interrupt request port 10 as provided with computer 7 shown in FIG. 1. A flip-flop 12 is built into this alternate embodiment of the peripheral device 13 and serves as a memory device which controls the transistor or relay 14. The relay 14 then activates the tape recorder motor (not shown). Detector 15 inputs the flip-flop 12 to turn the motor off and computer 11 inputs the flip-flop 12 to turn the motor on. A data port 16 reports output status of the flip-flop 12 back to computer 11.

Figure 3:
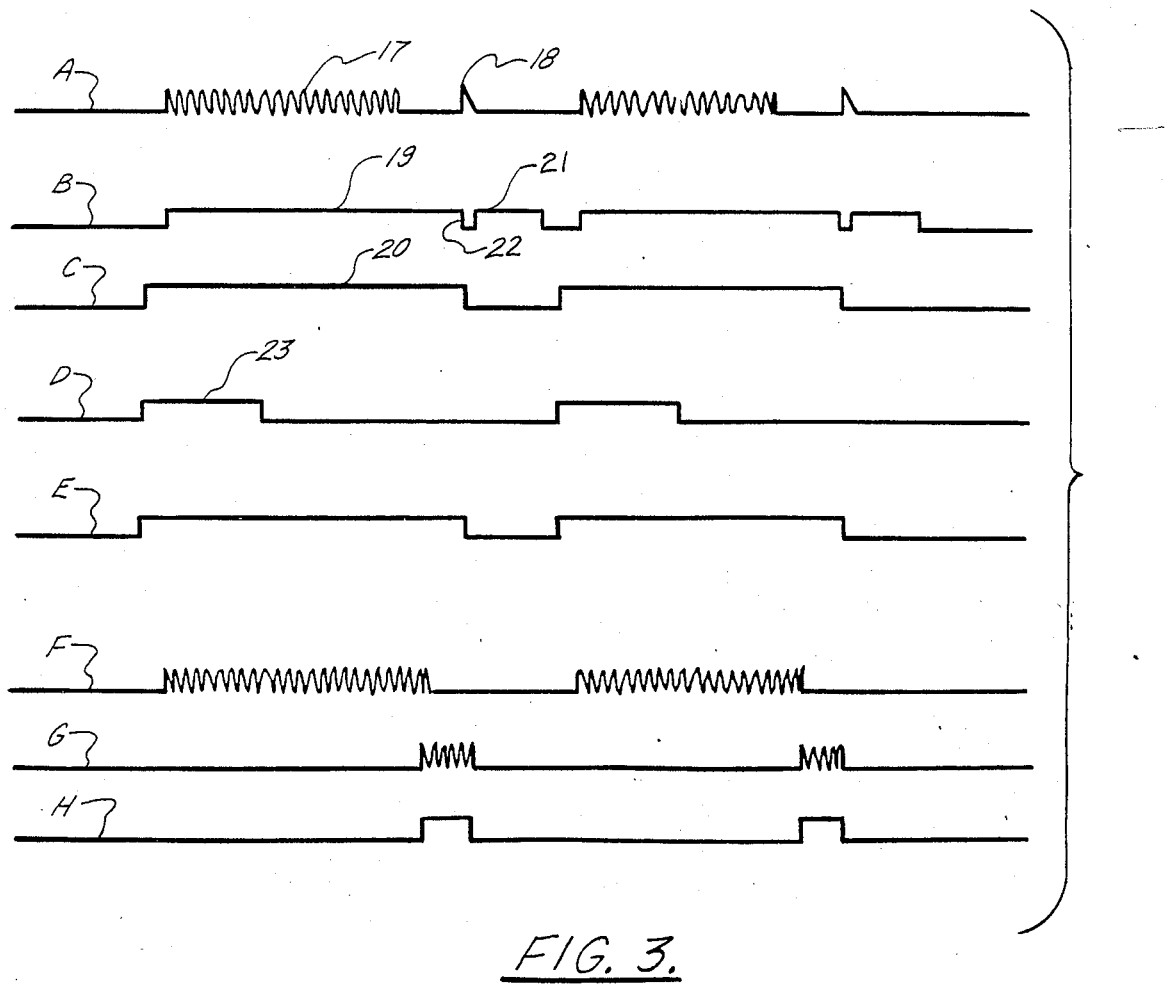
FIG. 3, consisting of A-H, is a timing diagram for FIGS. 1 and 2.

FIGS. 3A through 3E illustrate resulting signals where lengths of silence control the tape recorder motor. FIG. 3A illustrates the audio signal 17 seen at the output jack 4 of the tape recorder 1. The isolated spike 18 is the noise generated when the tape recorder 1 is turned off. The detector output 19 using a voice activated switch is illustrated in FIG. 3B. Because of the off delay, the output remains high for several seconds after the audio portion becomes silent. FIG. 3C applies to FIG. 1 only and shows the computer output 20 to relay 8. The output 20 must remain high for as long as the tape recorder plays. The output is brought low by the trailing edge of the first square wave pulse 22 of FIG. 3B. FIG. 3D applies to FIG. 2 only and shows the computer output 23 when used with a flip-flop. The length of the pulse should be shorter than any of the audio segments 17. FIG. 3E illustrates the status of the tape recorder motor.

The trailing edge of the signal from the detector is used to turn the tape recorder off. Consequently, action depends on the trailing edge of the detector's output. The computer 7, 11 is input to the relay 8 or flip-flop 12 depending on whether the computer is provided with an interrupt request port or not. This input 23 is level triggered and must be of a sufficient duration to override the spurious detector output 21 caused by the second pulse 18 as shown in FIGS. 3A, 3B, and 3D.

FIGS. 3C through 3H illustrate resulting signals where tones control the tape recorder motor. FIGS. 3C, 3D, and 3E illustrate the same equipment status as previously discussed. FIGS. 3F and 3G collectively represent two tracks of a stereo signal where FIG. 3F displays the audio track and FIG. 3G displays the tone track. FIG. 3H displays the output status of the tone detector.

Many other variations, modifications, and alternate embodiments may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of this invention, as defined in the following claims.

What I claim is:

1. A method for operationally synchronizing movement of a tape recorder with a program controlling a computer monitor, comprising the steps of:
    (a) recording an audio tape in a manner such that segments of sound are separated by fixed lengths of silence which serve as predetermined events;
    (b) playing back an audio tape on a tape player in conjunction with a monitor display under computer program control;
    (c) detecting said lengths of silence;
    (d) signaling said detection to a means for deactivating said tape player and inputting said detection to a memory means;
    (e) deactivating said tape player after said lengths of silence; and
    (f) activating said tape player under program control from a computer, inputting a signal from said computer to said memory means and inputting a signal from said memory means to said computer.

2. A method for operationally synchronizing movement of a tape recorder with a program controlling a computer monitor, comprising the steps of:
    (a) recording an audio tape in a manner such that segments of sound are separated by tones which serve as predetermined events;
    (b) playing back an audio tape on a tape player in conjunction with a monitor display under computer program control;
    (c) detecting said tones;
    (d) signaling said detection to a means for deactivating said tape player and inputting said detection to a memory means;
    (e) deactivating said tape player after said lengths of silence; and
    (f) activating said tape player under program control from a computer, inputting a signal from said computer to said memory means and inputting a signal from said memory means to said computer.

* * * * *